United States Patent [19]

Hanft et al.

[11] Patent Number: 4,464,070
[45] Date of Patent: Aug. 7, 1984

[54] MULTI-CHARACTER DISPLAY CONTROLLER FOR TEXT RECORDER

[75] Inventors: Roy F. Hanft; Gerald G. Pechanek, both of Lexington, Ky.

[73] Assignee: International Business Machines Corporation, Armonk, N.Y.

[21] Appl. No.: 393,981

[22] Filed: Jun. 30, 1982

Related U.S. Application Data

[63] Continuation of Ser. No. 107,467, Dec. 26, 1979, abandoned.

[51] Int. Cl.$^3$ .............................................. B41J 3/02
[52] U.S. Cl. ........................................ 400/98; 400/83
[58] Field of Search ..................... 400/17, 91, 92, 93, 400/94, 95, 98, 99, 110, 482, 484, 70, 83, 87

[56] References Cited

U.S. PATENT DOCUMENTS

| | | | |
|---|---|---|---|
| 1,275,657 | 8/1918 | Bullock | 400/98 |
| 2,717,686 | 9/1955 | Seeber, Jr. | 400/98 |
| 3,289,804 | 12/1966 | Schaefer | 400/98 |
| 3,630,336 | 12/1971 | Johnson et al. | 400/17 |
| 3,820,644 | 6/1974 | Yeh | 400/484 X |
| 4,010,837 | 3/1977 | Gremillet | 400/99 |

FOREIGN PATENT DOCUMENTS

1439274  6/1976  United Kingdom ................ 400/110

OTHER PUBLICATIONS

IBM Technical Disclosure Bulletin, "Word Generation System for Typist" Arellano et al., vol. 17, No. 8, Jan. 1975, pp. 2422–2423.
IBM Technical Disclosure Bulletin, "Abbreviated Typing for Word Processing", Todd, vol. 21, No. 9, Feb. 1979, pp. 3796–3797.

*Primary Examiner*—Ernest T. Wright, Jr.
*Attorney, Agent, or Firm*—Pollock, Vande Sande & Priddy

[57] ABSTRACT

A text recorder includes a multi-character display controller which is operated in a multi-character mode to record (e.g., print on paper or generate a CRT or the like display) multi-character sequences in response to operator actuation of a single key of a keyboard substantially identical to a conventional typewriter keyboard. Operator actuation of a key generates a coded signal representative of the actuated key, but in the multi-character mode, the normal text recorder function of printing or displaying the character associated with the key is inhibited, and instead, a memory device is accessed which has stored at a location corresponding to the actuated key, a sequence of coded signals representative of a plurality of characters, functions or both. The storage device may include a plurality of sets of stored signal sequences representing a plurality of multi-character sequences, the selection between the different storage sets being effected based on a particular key or key sequence previously actuated. Particular keys suitable for use in a multi-character mode are keys representing numeric characters, symbol graphics, or various punctuation marks. The invention is applicable to text recorders designed for use with English or foreign languages.

19 Claims, 13 Drawing Figures

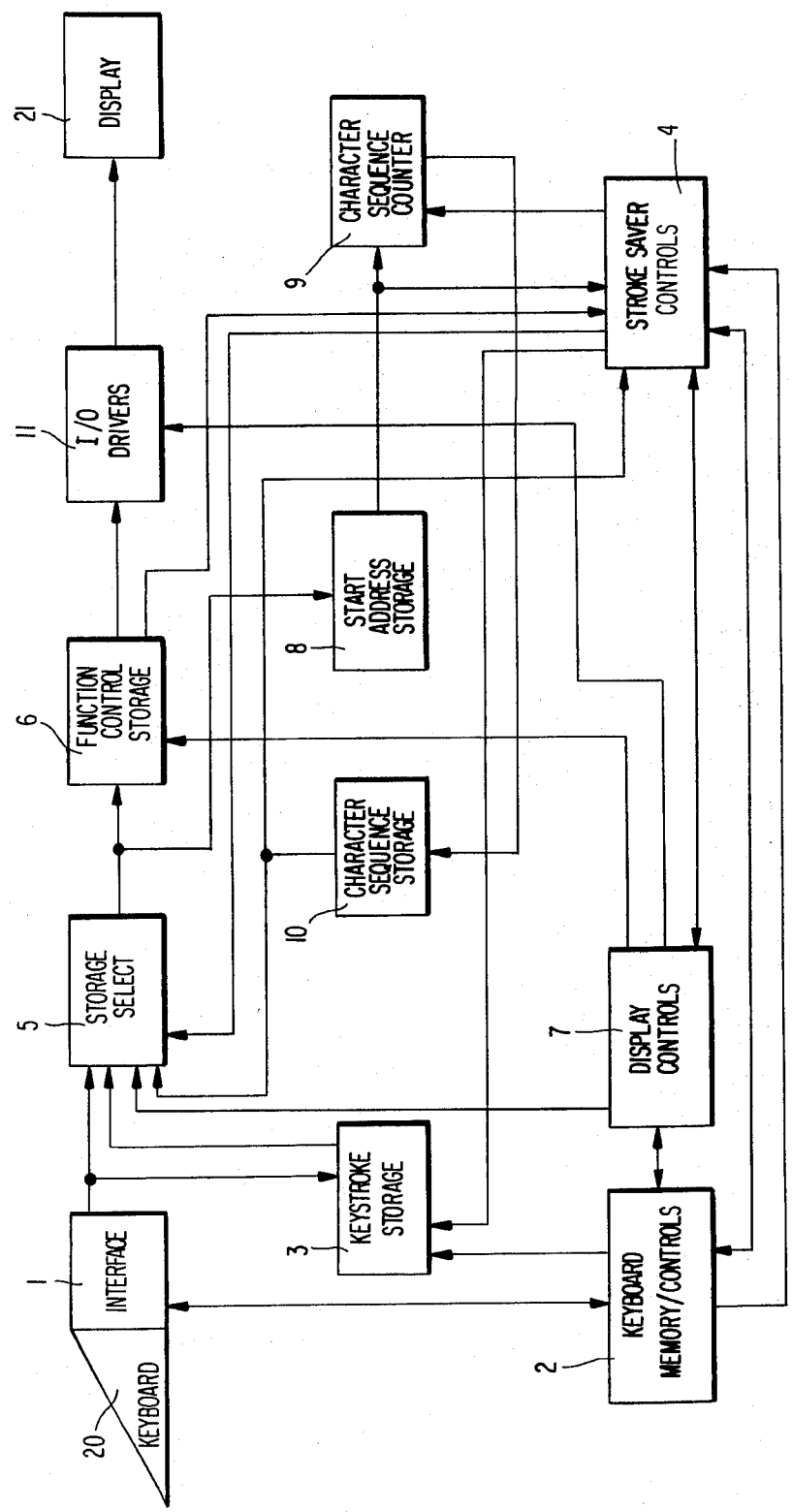

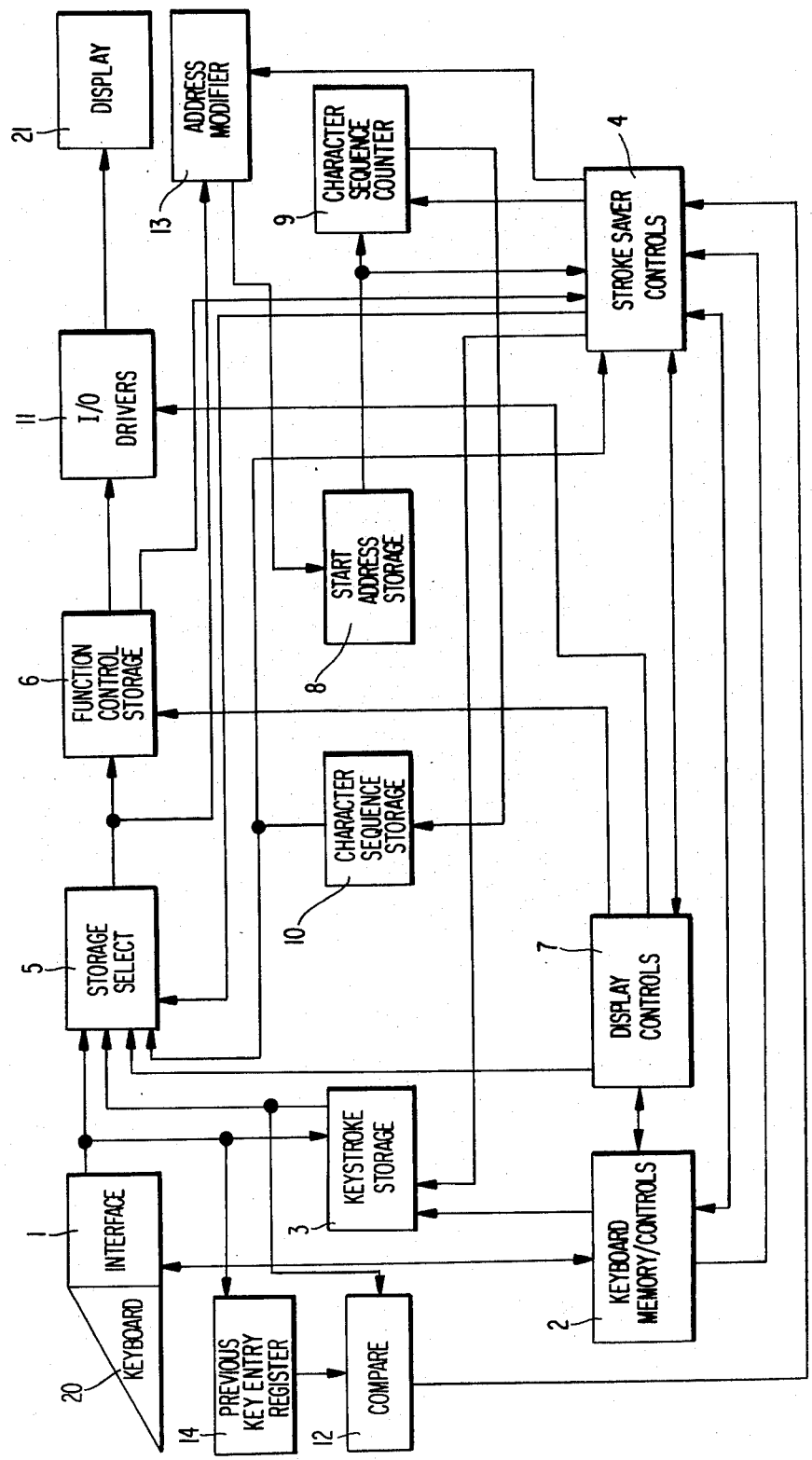

START ADDRESS STORAGE 8

| FUNCTION | ADDRESS |
|---|---|
| 0 0 | 6 BIT ADDRESS |
| 0 1 | |
| 1 0 | ADDRESS FILE 1 |
| 1 0 | ADDRESS FILE 2 |

58
59

| | FUNCTION | ADDRESS |
|---|---|---|
| 60 | 0 1 | o) ADDRESS |
| 61 | 0 0 | f) ADDRESS |
| 62 | 1 1 | |
| 63 | 0 1 | i) ADDRESS |
| 64 | 0 0 | n) ADDRESS |
| 65 | 1 1 | |
| 66 | 0 0 | Sp) ADDRESS |
| 67 | 0 1 | t) ADDRESS |
| 68 | 0 0 | h) ADDRESS |
| 69 | 0 0 | e) ADDRESS |
| 70 | 1 1 | |

CHARACTER SEQUENCE STORAGE 10

MULTI-CHARACTER DISPLAY CONTROLLER FOR TEXT RECORDER

This is a continuation, of application Ser. No. 107,467, filed Dec. 26, 1979, now abandoned.

FIELD OF THE INVENTION

The present invention deals with improvements in text recorders, i.e., typewriter or typewriter-like devices which may produce printed output, output in the form of a CRT display or the like, or both.

BACKGROUND OF THE INVENTION

The key arrangement of the conventional type keyboard has been in use for many years, and has remained unchanged notwithstanding a variety of suggestions for rearranging the keyboard to increase the keystroking efficiency or reduce the burden on the keyboard operator. The conventional key arrangement is sometimes referred to as QWERTY, representing the first five letters in the uppermost row of alphabetic characters.

Many of the suggestions, which involve rearranging the keyboard, have fallen by the wayside for the simple reasons that such a rearranged keyboard would be unfamiliar to the large population of keyboard operators and therefore represent an additional burden to those operators in "learning" a new keyboard.

Other suggestions have involved adding one or more different "control" keys so as to enable encoding different character or character combinations with respect to a number of the keys. A big disadvantage in suggestions of this sort is a substantial amount of retraining required in order for an operator to effectively use the additional coding levels provided by the "control" keys.

For example, Bullock in U.S. Pat. No. 1,275,657, suggested adding additional keys to the conventional keyboard, each of which, when depressed, would enable the printing of a word or phrase. Seiber, in U.S. Pat. No. 2,717,686, suggested using standard keys for phrase or word printing when an additional key or foot pedal was simultaneously actuated. In the absence of depression of the additional key or foot pedal, a single character or symbol is printed. Seiber also disclosed, in the same patent, that by providing a plurality of such special keys, the word or phrase printing capacity could be multiplied. In still another arrangement, Schaefer, U.S. Pat. No. 3,289,804, disclosed an extension of the well-known Selectric typewriter which employed a wholly conventional keyboard. However, when selected ones of the keys were depressed beyond normal depression distance, the machine simulated the result of depression of a specific key sequence, i.e., a specific alpha sequence, function sequence, numeric sequence or a mixed sequence.

The present invention seeks to improve on this prior art by providing a text recorder which enables improved keyboard efficiency for an operator by reducing the number of input strokes required during text typing. The term text recorder, in the present application, has reference to conventional typewriters, i.e, those producing a printed output via impact printing or otherwise, or typewriter-like devices which produce a text display employing a CRT or equivalent techniques, or devices capable of both types of outputs.

Frequency of word usage studies show that half of all communications in English are accomplished with less than 100 different words; every fourth word is among the 10–12 most common words in the written language, and two or three words make up about 10% of all communication. English is not unique in this usage of redundant words, indeed, this characteristic is found in the rest of the major languages. It is therefore an object of the present invention to improve keyboard efficiency by providing a practical and usable text recorder wherein many of these common words can be encoded and printed or displayed, with a single stroke. Reduction in keystroke effort is not limited to writing complete words from a single keystroke, indeed, it is also important to provide for commonly used syllables.

In accordance with one aspect of the invention, words or syllables are associated with those conventional keys in the keyboard which are infrequently used during text typing applications. In a normal mode of operation, the text recorder produces a conventional output, however, in a multi-character mode, the text recorder produces a word or syllable when the associated key is stroked. One large group of such keys are numerical keys. In order to expand the number of words or syllables comprising multiple characters which can be recorded with a single keystroke, each of the numeric keys can be associated both with a word and with a suffix if it is realized that words are called for after functions such as a space function or carriage return, and suffixes are only called for when preceded by an alphabetic character or a hyphen. Thus, stroking a single one of the numeric keys can produce, in a normal mode of operation, the recording of the associated numeral and in a multi-character mode, the recording of a suffix, if preceded by an alphabetic character or hyphen, or recording of an entire word is preceded by a keyboard function such as a space or carriage return operation. In addition to the numeric keys, the punctuation marks and other miscellaneous or graphic symbols on the conventional typewriter keyboard can similarly be employed. Further expansion of this capability can be achieved by providing for commonly used multiple word phrases, such as the phrases: "will be"; "and the"; "for the"; "in the"; "of the"; "from the". This is effected by associating each of the keys arranged to produce the words: "and"; "for"; "in"; "of"; "from"-with a second character sequence representing: space "be"; space "the"; space "the"; space "the"; space "the"; space "the"-. On the first actuation of the associated key in the multi-character mode, the text recorder produces the first word of the phrase, the second sequential actuation of the identical key produces the second sequence.

To further enhance the effectiveness of additional equipment required to provide the above-mentioned features, the codes representative of words or syllables produced in response to a single keystroke can be stored, and by providing a response to a shift or shift lock status, the first character in the sequence can be capitalized, a preselected character(s) in the sequence can be capitalized, or the entire sequence can be capitalized.

In accordance with another feature of the invention, when in a multi-character mode, actuation of any of the punctuation marks results in automatic production of a space function following the punctuation mark.

SUMMARY OF THE INVENTION

The invention meets the above-stated objects and provides features referenced above by providing a multi-character display controller for use in a text recorder of the kind having (1) a text display;
(2) keyboard apparatus including a plurality of keys, each producing a coded signal representing said key when actuated by an operator, and
(3) a decoder for receiving coded signals from said keyboard apparatus and for supplying corresponding drive signals to said text display, wherein the multi-character display controller includes:
a mode apparatus for producing a mode signal and for changing an operating mode of the text recorder from a normal mode to a multi-character mode, or from said multi-character mode to said normal mode when actuated by an operator,
an inhibiting device, responsive to said mode signal in a multi-character mode state for nullifying the normal response of the decoder to at least a subset of the coded signals,
an auxiliary decoder and a storage device associated with the auxiliary decoder, the storage device retrievably storing signals representing preselected character sequences at locations corresponding to respective coded signals of said subset, the auxiliary decoder responding to a coded signal within said subset when in a multi-character mode and to the storage device for supplying corresponding sequences of drive signals to the text display.

BRIEF DESCRIPTION OF THE DRAWING

Several preferred embodiments of the invention will now be disclosed in connection with the following portions of the specification when taken in conjunction with the attached drawing in which like reference characters identify identical apparatus and in which:

FIG. 3 is a block diagram of one preferred embodiment of the invention;

FIGS. 4A and 4B illustrate memory layouts for the start address storage and the character sequence storage of FIG. 3;

FIG. 5 is a block diagram of a second preferred embodiment of the invention which is a modification of the first preferred embodiment;

DETAILED DESCRIPTION OF PREFERRED EMBODIMENTS

Figure 1:
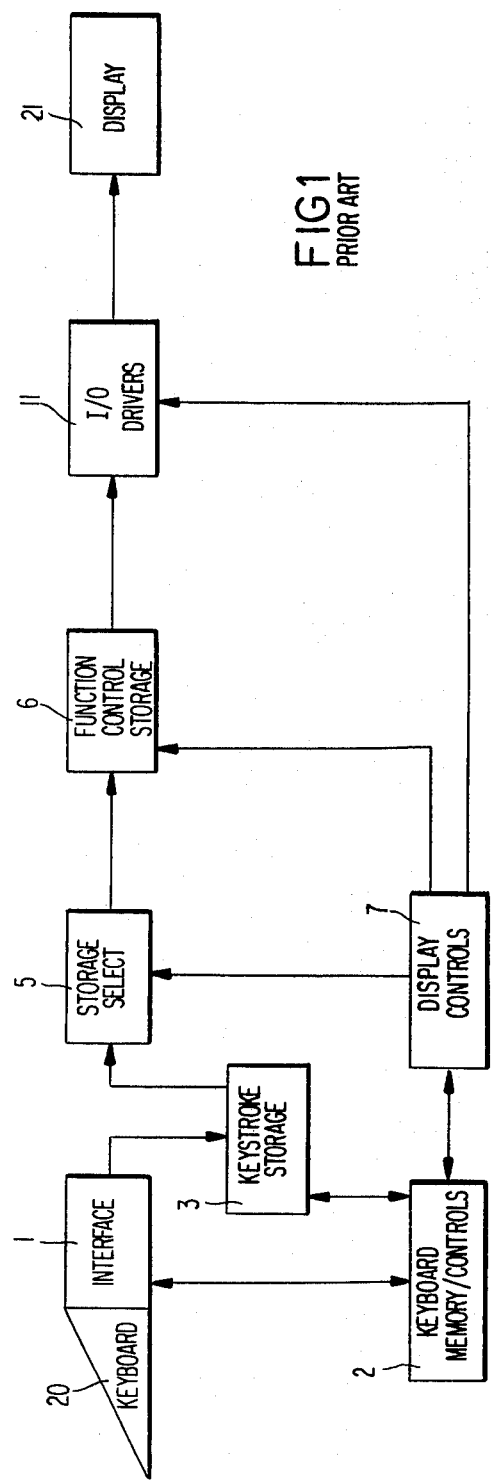
FIG. 1 is a block diagram of a character display device corresponding to the state of the prior art.

FIG. 1 a block diagram of a prior art text recorder. As shown in FIG. 1, input is provided to the text recorder through a keyboard 20, which may be a conventional keyboard, i.e., QWERTY. The keyboard 20 and interface 1 can include any conventional apparatus for producing coded signal representations which are unique to each of the plurality of keys contained therein. Such conventional devices operate on electromechanical or solely electrical principles, and typical examples are disclosed in U.S. Pat. No. 3,630,336 and employed in IBM Electronic Typewriter Models 50, 60 and 75.

The coded signal representations are available from interface 1 at a keystroke storage 3 and from the storage 3 at a storage select 5. The keystroke storage 3 is merely a buffer which is arranged to store coded signal representations resulting from the depression of at least one key, and typically, a plurality of keys, although usually the keystroke storage 3 is arranged to store at most the number of keystrokes corresponding to an entire line of type. The buffers for use in the keystroke storage 3 are well known to those skilled in the art.

The keyboard/memory control 2 includes at least a pair of counters 203, 204 (see FIG. 10) for reasons which will be explained hereinaftr. As each different set of coded signal representations is provided by keyboard interface 1, one of the counters 203 is incremented so that each coded signal representation produced by the keyboard interface 1 can be stored in sequential locations in keystroke storage 3.

When a coded signal representation is available in the keystroke storage 3 for output, the keyboard/memory control 2 provides an output request to display control 7. When such an output request has been received, the display control 7 enables the storage select 5 to address the function control storage 6, using as an address one of the coded signal representations stored in the keystroke storage 3. The function control storage 6 is a memory device for the purpose of translating the coded signal representations produced by the keyboard 20 and interface 1 into necessary drive signals to produce the desired display. Therefore, when addressed by the coded signal representation initially stored in the keystroke storage 3 and enabled by display control 7, the function control storage 6 produces at an output a representation of the necessary drive signals to produce the desired display.

The display control 7 allows the driver I/O unit 11, which merely comprises a plurality of amplifiers, to output the signals produced by the function control storage 6 to the display 21. When this operation is completed, and assuming another output request is pending, the display control 7 can move onto the next coded signal representation in the keystroke storage 3. To effect this, the keyboard/memory control 2 includes a second counter 204 which is incremented upon completion of an output function of the display control 7. Using the pair of address counters 203, 204 in the keyboard/memory control 2 enables the text recorder to buffer input and output functions, while at the same time, insuring the signals in the keystroke storage 3 produce output display in the proper sequence.

The display 21 may comprise a conventional impact printer, ink jet printer, or cathode ray tube or equivalent device for producing a graphic representation of an alphabetic character, a numeric character, a symbol or function, all corresponding to respective key actuations originally initiated at the keyboard 20. The manner in which the specific display is produced in response to appropriate drive signals and the instrumentalities used are well known to those skilled in the art.

Figure 2:
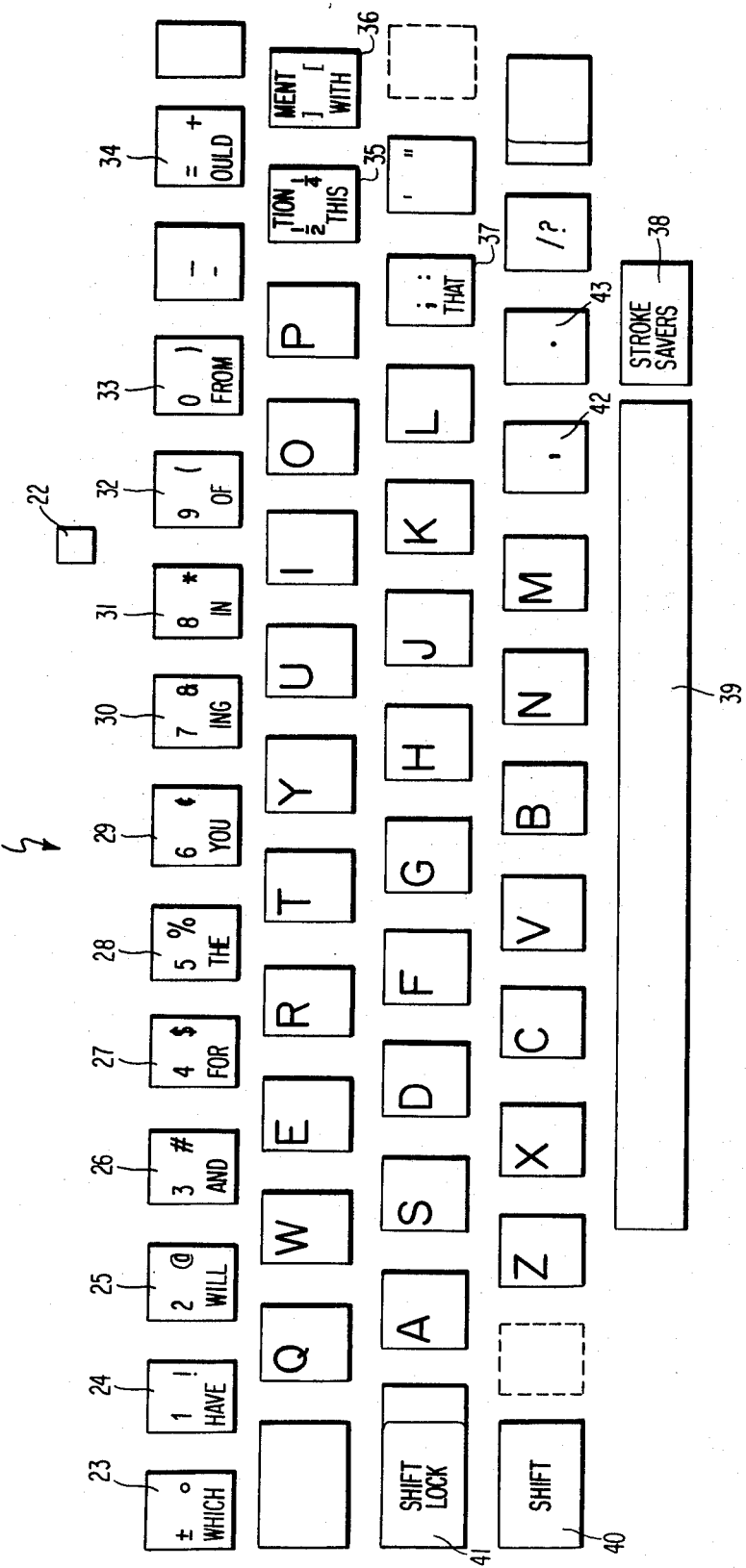
FIG. 2 illustrates the layout of the keyboard or input device for the text recorder of the present invention.

FIG. 2 is an example of the keyboard 20 constructed in accordance with the present invention. As shown in FIG. 2, the conventional typewriter keys corresponding to the alphabetic characters are included in a conventional layout; those alphabetic keys carry no reference characters in FIG. 2. However, in addition to the conventional keyboard, and adjacent to the space bar 39, a stroke saver mode key 38 has been added, the function of which will be explained hereinafter. In addition, some of the numeric row keys, i.e., keys 23-34, carry the conventional numeric character as well as the conventional symbol which is produced when a key is actuated in the simultaneous presence of a shift of shift lock function. In addition, some of the same keys (23-34) carry indicia representing a multi-character sequence, either a whole word or a syllable of a whole word. In addition, several keys which, in a conventional typewriter, carry only punctuation marks or other symbols such as keys 35-37, also carry one or more multi-character sequences; the function of these keys (35-37) will also be explained hereinafter. In addition, as is conventional, the keyboard 20 includes a shift key 40 and a shift lock key 41. Finally, on the keyboard 20 or in close proximity thereto, an indicator 22 is provided which can be used to allow feedback to the operator identifying the mode in which the text recorder is operating, either in a conventional mode or in a multi-character mode. The indicator 22 can, for example, comprise a light emitting diode or other visible output emitting device the energization of which will be discussed hereinafter.

In accordance with an embodiment of the invention, the text recorder with the keyboard 20 shown in FIG. 2 will produce the expected output on operator actuation of one of the keys when the text recorder is operating in the normal mode. The term conventional output refers to that output, i.e., character, symbol or function, printed or displayed, which the operator would expect from operating a conventional keyboard. However, actuation of the stroke saver mode key 38 places the text recorder in a multi-character mode; this mode is indicated to the operator by the energization of the indicator 22. Actuation of key 23, when in multi-character mode, will result in display of the multi-character sequence "which"; similarly, actuation of any of the keys 23-34 in the multi-character mode will result in the display of the multi-character sequence associated with the key. Actuation of either of the keys 35 or 36 in the multi-character mode will result in output of one or the other of the multi-character sequences associated with the key (35 or 36) depending upon the previously stroked key. Actuation of key 37, when in the multi-character mode, will result in the output of either a multi-character sequence associated with key 37 ("that") or the punctuation graphic, depending on the previously stroked key. As will be explained hereinafter, the multi-character sequence emitted by the text recorder in the multi-character mode may be entirely lower case format, or either selected character(s) or the entire sequence may be displayed in upper case format on appropriate actuation of either the shift key 40 or shift lock key 41.

As has been mentioned, actuation of any of the keys shown in the keyboard 20 of FIG. 2 results in the production of a coded signal representing the particular key. However, since the desired subject matter to be recorded may be different depending upon the operating mode in which the text recorder is operating, and may also be different depending upon the preceding key actuation, the manner in which the text recorder functions will now be explained in connection with FIGS. 3 and 4.

FIG. 3 comprises a block diagram of one embodiment of the inventive text recorder apparatus. As shown in FIG. 3, a stroke saver control 4, start address storage 8, character sequence counter 9, and character sequence storage 10 have been added. The stroke saver control 4 responds to status signals from the keyboard/memory control 2; these signals are used to control the states of the shift and shift lock status as well as normal or multi-character mode signals. In addition, the stroke saver control 4 also responds to an output of the function control storage 6, the display control 7, the start address storage 8 and the character sequence storage 10. In turn, the stroke saver control 4 may pass control signals to the keyboard/memory control 2, enable the storage select 5, enable or inhibit the display control 7 and cause the loading of or incrementing the character sequence counter 9.

In addition, the data path from the keyboard interface 1 to the keystroke storage 3 has been modified so that keystroke encoded signals can only reach the keyboard storage 3 when allowed by the keyboard/memory control 2.

The start address storage 8 includes, for each key designed to operate in a multi-character mode, a start address (or pointer) which refers to the character sequence storage 10. Character sequence storage 10 includes, at the address stored in the start address storage 8, a pointer to a representation of the drive signal to produce the first character or function called for by the key actuation in the multi-character mode which drive signal is stored in function control storage 6. Following that location, the character sequence storage 10 includes, in sequence, a pointer to each other representation of each other drive signal for a character or function which is included in the multi-character sequence. Finally, each sequence in the character sequence storage 10 concludes with an end code to indicate to the stroke saver control 4 that the entire desired multi-character sequence has been completed.

The apparatus shown in FIG. 3 will, in the multi-character mode, produce the multi-character sequence associated with each of keys 23-34. In addition, the multi-character sequence can be output in lower case format, or if the shift key 40 is depressed, selected character(s) in the sequence, for example, the first, will be output in upper case format, whereas the remaining characters will be output in lower case format. Finally, if the shift lock key 41 is engaged, the entire sequence will be output in upper case format.

Modifying the apparatus of FIG. 1 to operate in the multi-character mode, in accordance with the showing in FIG. 3 requires the addition of two storage devices, i.e., the start address storage 8 and the character sequence storage 10, the character sequence counter 9, and the stroke saver control 4 which includes a mode latch 210c (see FIG. 11) and a pair of latches 210a, 210b (see FIG. 11), one for shift status and another for shift lock status. In addition, an input to the storage select 5 is provided from the character sequence storage 10. An input to the display control 7 is provided from the stroke saver control 4 so as to inhibit normal operation of the display control 7 at certain times in the multi-character mode. An additional output from the function control storage 6 is provided to the stroke saver control 4 for purposes which will be explained hereinafter. The start address storage 8 is laid out in accordance with the illustration in FIG. 4A, i.e., each particular storage location provides multi-bit storage, two bits of which represent function codes and the remaining bits, for example, 6 bits, correspond to an address in the character sequence storage 10. Two different function codes are employed in the start address storage 8, a first function code, for example 00, designates a normal key, i.e., one that is not associated with any multi-character sequence in a multi-character mode, and a different code, for example 01, designating a stroke saver key, i.e., one that does correspond to a multi-character sequence in a multi-character mode of operation.

FIG. 4B illustrates the layout of the character sequence storage 10 which also provides multi-bit entry for each address. Each multi-bit entry includes an address corresponding to a single character, symbol or function, designating the location in the function control storage 6, wherein the drive signals representing that character, symbol or function may be located. Each entry in the character sequence storage 10 also includes a multi-bit function code. One particular code, for example 11, designates an end of entry, the use of which will be discussed hereinafter. Other function codes relate to capitalization control. In particular, a second function code, for example 00, designates a lower case character, and a different function code, for example 01, designates a potential upper case character. For the example shown in FIG. 4B, the first entry in the storage 10 identifies an address in function control storage 6, the output of which will produce the drive signals necessary to produce the alphabetic character "t" and the associated function code indicates a potential upper case character. This will be displayed in upper case depending upon the shift status. The next two entries are, respectively, addresses for alphabetic characters "h" and "e" and the associated function code indicates both are lower case characters.

Figure 11:
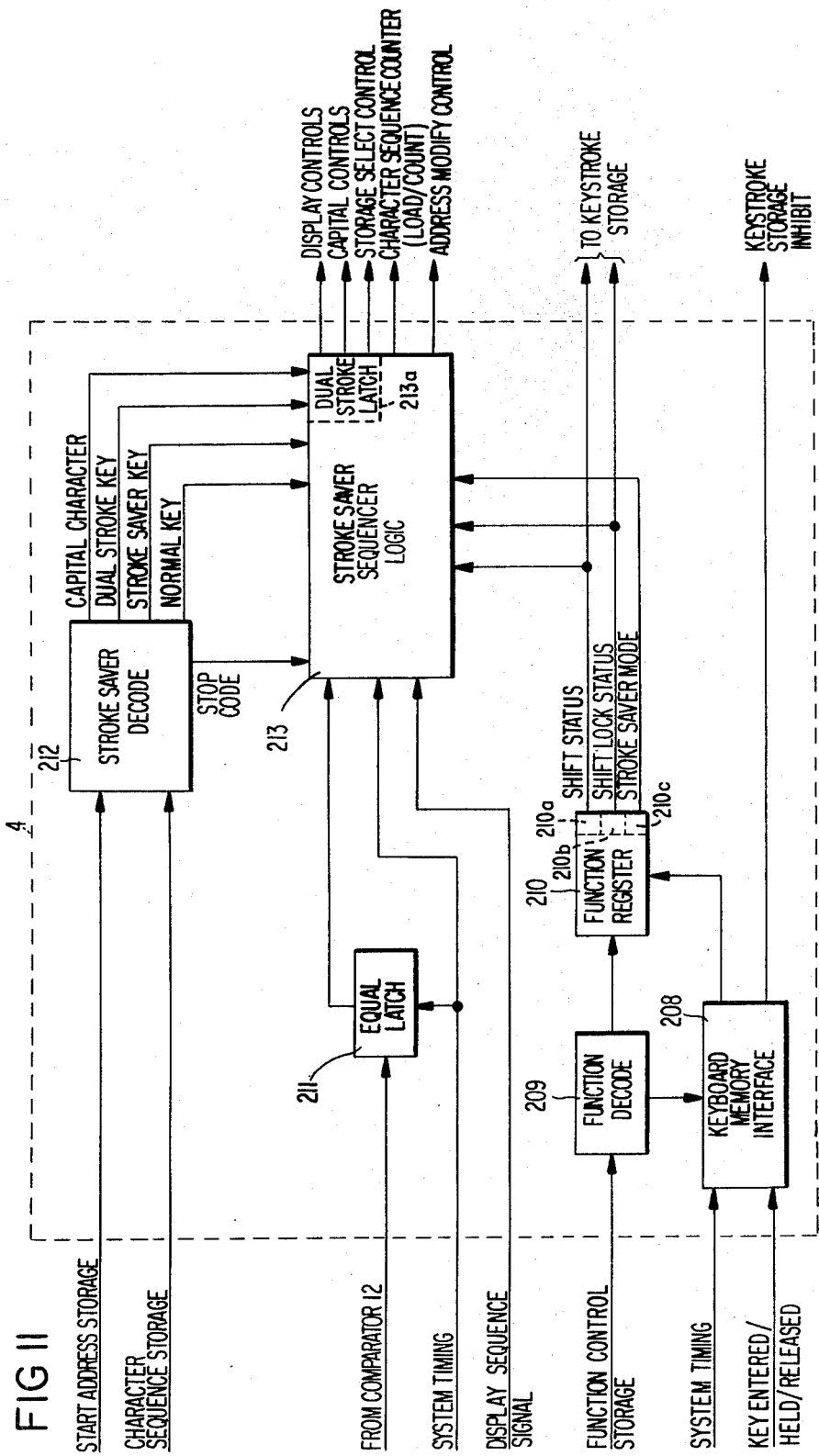

Three of the significant factors with which the stroke saver control 4 is concerned are the mode, i.e., normal and multi-character, and the status of the two shift latches 210a, 210b. The stroke saver control 4 includes a latch 210a or 210b for each one of the factors. Actuation of key 38 (the stroke saver mode key), key 40 (the shift key), or the key 41 (the shift lock key) results in the keyboard 20 producing a unique code identifying the actuated key. In processing this key actuation, the code is coupled from the interface 1 to the storage select 5 which addresses the function control storage 6. The output of function control storage 6 is coupled to the stroke saver control 4, and depending upon which key was actuated, the condition of the stroke saver control latches 210a, 210b, 210c may be changed. For example, if the stroke saver mode key 38 is depressed, the status of the mode latch 210c is changed from normal to multi-character or vice versa. In a similar fashion, the shift lock and shift latches 210a, 210b in the stroke saver control 4 track the status of the associated keys. As shown in FIG. 11, the function register 210 includes a shift latch 210a, a shift lock latch 210b and a stroke saver mode latch 210c. Processing for any of the other keys begins in a similar fashion, i.e., the key actuation results in the keyboard interface 1 creating a code unique to the actuated key. This is coupled to the storage select 5 which addresses the function control storage 6. The corresponding output of the function control storage 6 is coupled to the stroke saver control 4. At this point, the stroke saver control 4 determines whether or not to store the corresponding key code in keystroke storage 3. Keyboard memory control 2 monitors the status of the addresss counters 203, 204 and, assuming storage space is available, the key code is stored, along with the status of the shift and shift lock latches 210a and 210b. Once stored, the keyboard/memory control 2 issues a display request to the display control 7, since there is a stored keystroke awaiting display. The display request issued by the keyboard/memory control 2 allows the display control 7 to enable the storage select 5 to respond to the now-stored key code in the keystroke storage 3. The storage select 5 employs the stored key code to address the function control storage 6 and the start address storage 8. Outputs for both function control storage 6 and start address storage 8 are decoded in the stroke saver control 4. By monitoring the function code associated with the start address storage entry, stroke saver control 4 determines that a key is or is not a multi-character mode key; if it is, normal display processing may be inhibited by the stroke saver control 4 dependent on the mode which is reflected in stroke saver control 4 in the form of the mode latch 210c. Instead of normal display processing, the stroke saver control 4 can effect a substitution for the character associated with the key code with a sequence of characters, or characters and functions, as will now be explained.

The first entry address in the start address storage 8 is loaded into the character sequence counter 9 where it is used to address the character sequence storage 10. The start address storage 8, character sequence counter 9, character sequence storage 10 and associated apparatus perform an auxiliary decoding function and may be referred to as auxiliary means. Stored at the addressed location of the character sequence storage 10 is the address of a location in function control storage 6 corresponding to the first character in the desired multi-character sequence. Stroke saver control 4 enables the output of the character sequence storage 10 to address the function control storage 6 through storage select 5. As a result, function control storage 6 outputs the necessary drive signals for display of the first character. Display of this character is effected in upper or lower case, dependent upon the shift and shift lock status bits and the character capital decode from the character sequence storage 10.

Before conclusion of the print cycle or the display cycle, the stroke saver control 4 increments the character sequence counter 9 and thus, a new location in character sequence storage 10 is addressed. The stroke saver control 4 examines the associated function code to determine whether a stop code has been detected. Assuming a stop code is not detected, a similar sequence is enabled wherein the character sequence storage entry is employed as an address in the function control storage 6 to produce the drive signal necessary to produce the next character. This operation continues until incrementing the character sequence counter 9 results in addressing a location in character sequence storage 10 whose associated function control represents a stop code. At detection of the stop code at the stroke saver control 4, the incrementing of the character sequence counter 9 is terminated and this allows the next key code stored in the keystroke storage 3 to be used for output purposes.

Because of the buffered operation between the input and output, i.e., keyboard interface 1 and keystroke storage 3, operator input is not inhibited during the course of outputting a multi-character sequence.

While the multi-character sequence illustrated in FIG. 4B comprises purely alphabetic characters, this is not essential and numeric characters or mixed alphanumeric characters can be addressed by the character sequence storage 10 and thus produce a corresponding multi-character sequence. In addition, since display functions such as space, hyphen, punctuation marks, carriage return or the like are also driven through the function control storage 6, such functions can also be mixed in with the multi-character sequence in the character sequence storage 10.

With the arrangement shown in FIG. 3, each multi-character sequence, associated with a different key, has a corresponding start address storage location or entry point, and regardless of the number of times that particular key is depressed in a multi-character mode, the same multi-character sequence is displayed. However, as is mentioned above, much English text is comprised of word pairs, for example, the combinations previously mentioned. Thus, for example, it would be worthwhile to be able to reduce the multi-character sequence "space be" on a second depression of a key after an initial depression of the same key so that with two sequential actuations of a key, a phase such as "will be" will be displayed. This can be effected by the modification of the apparatus of FIG. 3 which is illustrated in FIG. 5.

As is shown in FIG. 5, the apparatus of FIG. 3 has been modified by the addition of an address modifier 13, a previous key entry register 14 and comparator 12. In addition, stroke saver control 4 is now modified to include a dual stroke latch 213a and an equal latch 211 (illustrated in FIG. 11). The sequential depression of the same stroke saver key, in a multi-character mode, causes a second file to be accessed on the second actuation which results in a different multi-character sequence. Accordingly, the first actuation of a key associated with plural multi-character sequences will call up the first multi-character sequence, a second sequential actuation of the identical key will call up the second multi-character sequence and so on. This operation is effected by firstly storing in register 14 the previous key entry, and on a subsequent key entry, making a comparison in the comparator 12. If the comparison indicates sequential actuation of the identical key, the equal latch 211 in the stroke saver control 4 is set so that the key code, when employed as an address to address the start address storage 8, is first modified to select a different start address, i.e., that start address associated with the second multi-character sequence.

The operation of the apparatus shown in FIG. 5 is, for the most part, similar to the operation described in connection with FIG. 3. Assume, for example, that key 32 (of FIG. 2) has associated therewith a first multi-character sequence "of" and also has associated therewith a second multi-character sequence "space the" where "space" indicates the display function of producing a space. Accordingly, the key code corresponding to key 32 will address a location at start address storage 8 corresponding to which an address will be stored in the character sequence storage 10 which, when employed to address function control storage 6, will produce either the first character "o" or the display function—space—. In more detail:

When key 32 is actuated, its unique code addresses the function control storage 6 through storage select 5. The stroke saver control 4 responds thereto allowing the keyboard/memory control 2 to induce the code to be stored in keystroke storage 3, along with the present status of shift and shift lock latches 210a, 210b. Subsequently, the keyboard/memory control 2 issues a display request to the display control 7 and allows the next sequential key code in the keystroke storage 3 to be processed for display, i.e., the code corresponding to key 32. At this time, the comparator 12 compares the code for the key 32 with the previous key entry register 14, and assuming that this was the first actuation for key 32, the comparator 12 will not indicate a comparison. The key code corresponding to key 32 is then used to address the function control storage 6 and the start address storage 8. At this point in time, the address modifier 13 does not modify the address for reasons which will be explained hereinafter. The stroke saver control 4 examines the function code associated with the entry from start address storage 8, indicating that the key 32 is a stroke saver key, and assuming the recorder is in the multi-character mode, inhibits normal display operation. At the same time, as will be explained hereinafter, the function code associated with the start address storage location addressed will indicate this is a dual stroke key, i.e., that it can address more than one multi-character sequence; accordingly, a dual stroke latch 213a in the stroke saver control 4 will be set. At the same time, the address associated with the entry addressed in the start address storage 8 is loaded in the character sequence counter 9. This address points to the first character of a multi-character sequence in the character sequence storage 10; the associated address from character sequence storage 10 is used to address the function control storage 6 through storage select 5 producing the drive signals for the character "o". This character is output either in lower or upper case form, depending upon the shift and shift lock status bits and the character capital decode from the character sequence storage 10. At this time, the code for key 32 is loaded in the previous key entry register 14. Before the end of the display cycle, character sequence counter 9 is incremented and the stroke saver control 4 determines whether or not a stop code has been detected. If not, the next character is output and so on until a stop code is detected. When the stop code is detected, the recorder begins processing the next keystroke entry; note at this time the dual stroke latch 213a is set.

Assuming the next keystroke is another actuation of key 32, a similar operation occurs except that now when the comparison is made by the comparator 12, equality is the result. The equality result from comparator 12 causes an equal latch 211 in the stroke saver control 4 to be set. If the comparison had not been successful, the dual stroke latch 213a in stroke saver control 4 would be reset.

However, continuing with our example, with the equal latch 211 and dual stroke latch 213a both set, the code corresponding to the key 32 forwarded from storage select 5 to the start address storage 8 is now modified by the address modifier 13. Address modifier 13 may simply add an offset to the key code to address a different area in the start address storage 8. As a result, a different location in character sequence storage 10 is addressed which will produce a different output sequence. The succeeding operations have already been explained, i.e., as each location in character sequence storage 10 is addressed, it reads out an address associated with function control storage 6 to produce the drive signals for generating the associated character and the sequence continues until a stop code is detected. When the last character in the second multi-character sequence has been output, the recorder proceeds on to locate the next key actuation. Since the second multi-character sequence was begun at a different location in character sequence storage 10, a different sequence results. In this fashion, actuation of key 32 can, in a normal mode of operation, produce the numeral 9, in the multi-character mode, the first actuation of the key 32 can produce multi-character sequence "of" and a second actuation of the key 32 immediately following a first actuation of the key 32 will produce the multi-character sequence "space the". Of course, each time key 32 is actuated in the multi-character mode, the same sequence "of" will be produced unless the actuation of key 32 immediately follows prior actuation of the same key 32.

Figures 6A, 6B, 7:
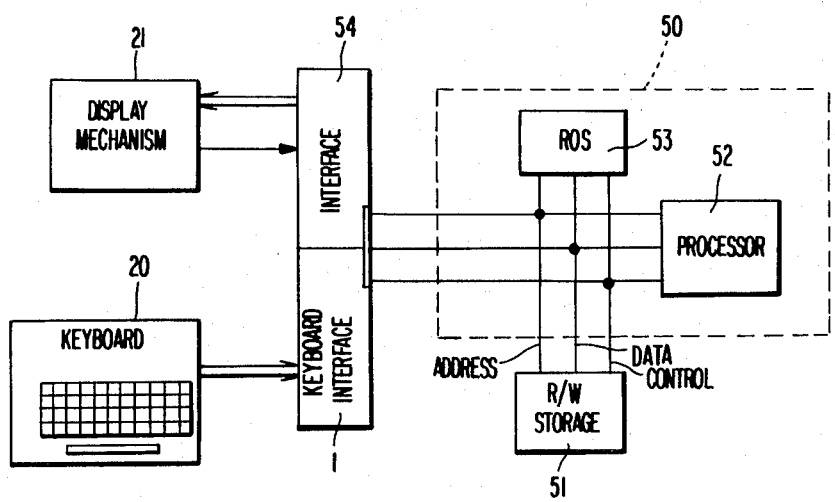
FIGS. 6A and 6B illustrate typical memory layouts for the start address storage and character sequence storage of FIG. 5.
FIG. 7 is a block diagram of a third preferred embodiment of the invention incorporating a microprocessor with architecture similar to IBM Model 75.

FIGS. 6A and 6B illustrate, respectively, typical entries in a start address storage 8 and typical entries in a character sequence storage 10 associated with the apparatus of FIG. 5. Referring first to FIG. 6A, each entry is divided into a multi-bit function code, and a multi-bit address. As shown in FIG. 6A, the function code is two bits long, a first function code, for example 00, identifies a normal key, i.e., one not associated with the stroke saver mode of operation. When such a function code is detected by the stroke saver control 4, normal display operation is allowed to continue. A second function code, for example 01, indicates a stroke saver key, but a key which does not have dual stroke capabilities. Accordingly, the stroke saver control 4, on detecting such function code, inhibits the normal display control operation, but the dual stroke latch 213a is not set. Another function code, for example 10, identifies a stroke saver key with the dual stroke capability. Detection of such code sets the dual stroke latch 213a in stroke saver control 4. For each dual stroke key, two entries are provided in the start address storage 8; the entries are offset by the offset provided by the address modifier 13. Each entry includes a pointer to a different entry in the character sequence storage 10. Before illustrating an example, typical contents of the character sequence storage 10, shown in FIG. 6B, will be discussed. As shown in FIG. 6B, each entry in the character sequence storage 10 also includes a multi-bit function code and an address. One function code, for example 00, identifies a character which is to be printed in lower case, a second function code, for example 01, identifies a character which can be printed in upper case, and a third function code, for example 11, is the stop code. The shift lock latch 210b, when set, will result in all characters capitalized. When the shift latch 210a is set, only those characters with function code 01 will be capitalized.

Thus, for example, a first plurality of entries in the character sequence storage 10, the entries identified at locations 60, 61 and 62 include two entries, one for addressing in the function control storage 6, the location producing the drive signals necessary to display the character "o" and the second entry resulting in production of the character "f", the third entry being a stop code.

Entries 63–65, in a similar fashion, when interrogated result in the display of the multi-character sequence "in".

Entries 66–70 may, for example, represent the second multi-character sequence for use with a dual stroke key. Thus, the first entry results in a spacing function, and the next three entries produce the characters "the", the last entry comprising the stop code.

If, for example, the key code generated by key 31 addresses location 58 in the start address storage 8, and the address modifier 13 offset the location in the start address storage 8 accessed by an amount sufficient to access location 59, and assuming further that the address at location 58 referred to location 63 in the character sequence storage 10 and the address associated with location 59 accessed location 66 in the character sequence storage 10, the following sequence of events occurs on dual depression of key 31 in the multi-character mode. The key code for key 31 accesses location 58 in the start address storage 8, unmodified since we further assume that previous keystroke was not that of key 31. As a result, stroke saver control 4 recognizes that the key 31 is a stroke saver key and since the apparatus is in the multi-character mode, the stroke saver control 4 inhibits normal display operation thereby precluding outputting the character 8 or *. At the same time, locations 63 through 65 in the character sequence storage 10 are accessed and thus the characters "in" are displayed. Just prior to completion of display of the character "i" the key code corresponding to key 31 is stored in the previous key entry register 14. Since the stroke saver control 4 recognized this as not only a stroke saver key but a dual stroke key, the dual stroke latch 213a is set. With the second stroke of key 31, the comparator 12 indicates an equality and therefore the equal latch 211 in the stroke saver control 4 is also set. Accordingly, in processing this second key stroke entry, the normal key code accessing location 58 is modified so that the access is to the location 59. As a result, locations 66-70 in the character sequence storage 10 are accessed, resulting in display of "space the". As a result, the sequential actuation of key 31 results in the display of the plural multi-character sequence "in the".

Figure 10:
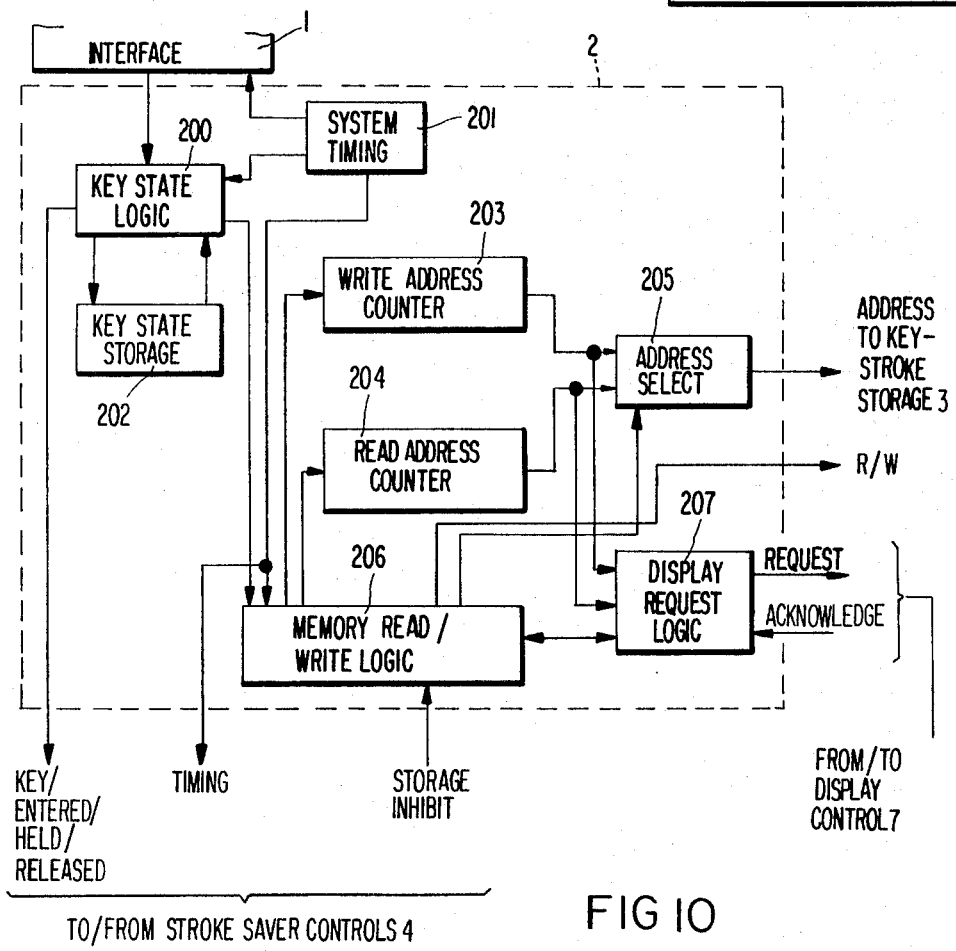

FIGS. 10 and 11 disclose, in a detailed block diagram fashion, the apparatus included in the block keyboard-/memory control 2 and stroke saver control 4 of FIGS. 3 and 5. As shown in FIG. 10, the keyboard/memory control 2 responds to the interface 1, to the display control 7 and to the stroke saver control 4, and provides signals in turn to the interface 1, to the display control 7, to the stroke saver control 4 and the keystroke storage 3. Included in the keyboard/memory control 2 is a key state logic circuit 200, a key state storage circuit 202, system timing 201, a write address counter 203, a read address counter 204, an address select 205, a memory read/write logic 206 and a display request logic 207.

The key state logic circuit 200 responds to the key code signals produced by the interface 1, and to the signals from the key state storage circuit 202 to determine the three states of a key entry, i.e., first entry, held depressed and key released. These determinations are made in conjunction with the system timing 201. The system timing 201 synchronizes the output of the interface 1 and the key state logic circuit 200. Thus, for example, the system timing 201 strobes interface 1 to determine whether or not a key is depressed. When the output of interface 1 has settled the system timing 201 can strobe the key data logic circuit 200 to determine the first entry, held depressed or released status of a key and to, at the same time, update the key state storage circuit 202 for a future comparison. The comparison is made by comparing the identity of an actuated key (identified by the coded signal from interface 1) with a prior condition for that key maintained in key state storage circuit 202.

The read and write address counters 203 and 204, respectively, are used to address the keystroke storage 3, and which of these counters (203 or 204) is employed is determined by the address select 205. The counters (203 or 204) are incremented or reset and the address select 205 is operated by signals from the memory read/write logic 206. In turn, the memory read/write logic 206 responds to the system timing 201, the key state logic circuit 200, a storage inhibit signal provided by the stroke saver control 4, as will be explained, and signals from the display request logic 207. For each key actuation, the storage of which is not inhibited (as will be explained), the memory read/write logic 206 increments the write address counter 203, so that the key code can be written at the next sequential location in the keystroke storage 3. At the same time, the address select 205 is allowed to gate the contents of the incremented write address counter 203 out to address the keystroke storage 3. In addition, the memory read/write logic 206 outputs a display request to display request logic 207; when the request is acknowledged by the display control 7, a corresponding signal at the memory read/write logic 206 causes the read address counter 204 to be incremented and allows the address select 205 to gate the incremented contents of the read address counter 204 out to address the keystroke storage 3. In this fashion, sequential key actuations are placed in sequential locations in the keystroke storage 3, and display of the contents of the keystroke storage 3 are effected in sequential order. The use of the two counters 203 and 204 allows this buffered operation to proceed. This normal operation may be prevented on the receipt of a storage inhibit signal from the stroke saver control 4, which signal is produced when the stroke saver control 4 determines that a key actuation is the result of the depression of the stroke saver mode key 38 or the shift or shift lock keys 40 or 41, respectively, since actuation of these keys (38, 40 or 41) does not result in storage of a key code. Description of the operation of the keyboard/memory control 2 will be deferred and provided in conjunction with the description of the operation of the stroke saver control 4.

FIG. 11 is a detailed block diagram of the stroke saver control 4. As shown in FIG. 11, the stroke saver control 4 responds to signals from the start address storage 8 and the character sequence storage 10, from the comparator 12, from the system timing 201, from the display control 7, the function control storage 6 and the keyboard/memory control 2. In addition, the stroke saver control 4 provides signals to the key stroke storage 3, to the memory read/write logic 206 in the keyboard/memory control 2, to the address modifier 13, to the character sequence counter 9, to the storage select 5 and to the display control 7.

More particularly, the stroke saver control 4 includes a stroke saver decode circuit 212 which responds to the function portion of either the start address storage 8 or the character sequence storage 10. This function portion is decoded to indicate a capital character, a dual stroke key, a stroke saver key, a normal key or a stop code. The output of the stroke saver decode circuit 212 is provided to the stroke saver sequencer logic 213 which includes a dual stroke latch 213a. Other inputs to the stroke saver sequencer logic 213 are provided by the equal latch 211 which, in turn, may be set from the comparator 12 (see FIG. 5). Other inputs to both the equal latch 211 and the stroke saver sequencer logic 213 are provided by the system timing 201, as well as signals from the display control 7. The stroke saver control 4 also responds to the output of the function control storage 6, which is provided to a function decode circuit 209. The function decode circuit 209 is arranged to respond to the key codes generated by interface 1 in response to actuation of one of three keys, i.e., the stroke saver mode key 38, the shift lock key 41, or the shift key 40. Decoding actuation of any of these keys (38, 40 or 41) provides two results. Firstly, the corresponding latch (i.e. stroke saver mode latch 210c, shift lock latch 210b or shift latch 210a) in function register 210 is caused to coincide with the status of the associated function. More particularly, function register 210 includes at least three latches, the stroke saver mode latch 210c shift lock latch 210b and shift latch 210a. Each of latches 210a–210c an output to the stroke saver sequencer logic 213, and the latter of the two latches, specifically 210a and 210b, also provide an output to the keystroke storage 3, the reason for which will be explained hereinafter. In addition, the keyboard memory interface 208 responds to the output of the function decode circuit 209 as well as to the system timing 201 and to the status of the key entered/held/released from key state logic circit 200. Yhe keyboard memory interface 208 provides firstly, an output to the function register 210 and the keystroke storage inhibit signal to the keyboard memory read/write logic 206. The entry of shift, shift lock or stroke saver will, at the time of a stroke determined by the system timing 201, change the condition of the associated latch 210a, 210b 210c in function register 210. Similarly, the release of shift status or shift lock will, at the appropriate stroke time, change the status of the associated latch 210a or 210b in the function register 210. On the other hand, the stroke saver mode alternates from key depression to key depression such that holding or releasing the stroke saver mode key 38 has no effect on the associated latch 210c but instead, the latch 210c changes state on each entry. The output of the mode latch 210c in register 210 is also used to enable indicator 22 (FIG. 2) when the latch 210c is set to provide the operator with feedback. The change of state of any of keys 38, 40, 41 as detected by the function decode circuit 209 will, based on the appropriate strobe generated by the system timing 201, generate the keystroke storage inhibit such that the stroking of that key 38, 40, 41 does not result in entry of a code in the keystroke storage 3.

As mentioned in connection with FIGS. 3 and 5, the key code generated in interface 1 is stored in the keystroke storage 3 when enabled by the keyboard memory control 2. In addition, the status of the shift and shift lock latches 210a, 210b is also stored, for reasons to be explained hereinafter. With the foregoing in mind, an explanation of the operation will now be provided.

To simplify the description of the operation, we will assume that the text recorder is in a stroke saver mode as a result of a previous actuation of the stroke saver mode key 38, i.e., the corresponding latch 210c is set. We will now explain the response of the text recorder to stroking of a typical key, such as key 27.

The keyboard interface 1, synchronized by the system timing 201 creates a multi-bit signal (sometimes referred to as the key code) which represents the actuated key, as this case key 27. The signal is provided to the key state logic circuit 200, which compares the status of key 27 with the previous status of key 27 obtained from the key state storage circuit 202. Based on the conditions we have laid down, that status will be key entered. At the same time, the status of key 27 in key state storage circuit 202 is altered so that if the key 27 remains depressed, its status will be considered on a following comparison as key held rather than key entered. The key code, from the interface 1, is coupled through the storage select 5 and addresses a unique location of the function control storage 6 corresponding to the key code. The output from the function control storage 6 is provided to the function decode circuit 209 (FIG. 11). As described, the function decode circuit 209 is arranged to decode only the stroke saver mode 38, shift 40 and shift lock 41 keys and in the event of such a decode to produce a storage inhibit signal. Since the key 27 we have assumed to have been actuated is not one of keys 38, 40, 41 storage inhibit signal is not generated.

In the absence of a storage inhibit signal, the memory read/write logic 206 increments the write address counter 203 and causes the address select 205 to pass the contents of the incremented write address counter 203 on to address the keystroke storage 3. The read/write signal causes the key code for the actuated key, in this case corresponding to key 27, to be written into the keystroke storage 3. As shown in FIGS. 3, 5 and 11, the status of the shift and shift lock latches 210a, 210b in function register 210 are also coupled to the keystroke storage 3, with the status of latches 210a, 210b stored along with the code for the actuated key, in this case key 27.

If, on the other hand, the actuated key was one of the shift 40, shift lock 41 or stroke saver mode 38 keys, the interface 1 would create the corresponding key code and the key state logic circuit 200 would generate a key entered status for this key, specifically one of keys 40, 41 or 38. At the same time, the key code is coupled to the storage select 5 to address a unique location in the function control storage 6. The output of the function control storage 6, coupled to the function decode circuit 209 would, in conjunction with the system timing 201 and key entered status signals, result in the production of a key stroke storage inhibit signal. As a result, the memory read/write logic 206 does not cause incrementing of the write address counter 203 and does not couple an address through the address select network 205 to the keystroke storage 3. As a result, the key code for the stroke saver mode 38, shift 40 or shift lock 41 key depression is not stored in the keystroke storage 3. However, depression of one of these keys (38, 40 or 41) would, if appropriate, cause the status of the associated latch either 210a, 210b or 210c in the function register 210 to track the change in the key status.

Continuing on, however, with our example, after storage of the key code in the keystroke storage 3, the memory read/write logic 206 initiates a display request through the display request logic 207. The display request logic 207 monitors the outputs from the read address counter 204 and the write address counter 203 to determine if there are any buffered codes in the keystroke storage 3. The display control 7 returns with a display acknowledgement if it is not in the process of processing a prior key code. The display request logic 207, on receiving the display acknowledge, passes control to the memory read/write logic 206 to read out the next key code to be processed. This is accomplished by the memory read/write logic 206, by incrementing the read address counter 204 and allowing the address counter contents to address the keystroke storage 3. On reading out the contents of the keystroke storage 3, the data read out is, of course, the key code corresponding to the actuated key, in this example, key 27, as well as the status of the shift and shift lock latches 210a, 210b at the time the key was entered. Display control 7 enables the storage select 5 to address the function control storage 6 and the start address storage 8.

The contents of the start address storage 8, coupled to the stroke saver decode circuit 212 (FIG. 11) determines whether or not a stroke saver key had been actuated. In our example, of course, key 27 is a stroke saver key. In addition, in connection with FIG. 5, the stroke saver decode circuit 212 also determines whether or not the key depressed is a dual stroke key. The decoded results are coupled to the stroke saver sequencer logic 213.

The stroke saver sequencer logic 213 is a state sequencer which depends on multiple inputs, including:
1. stroke saver mode from the corresponding latch (210c) in the function register 210;
2. shift status from the associated latch (210a) in function register 210;
3. shift lock status from the associated latch (210b) in function register 210;
4. character capital signal from stroke saver decode circuit 212;
5. dual stroke key status from the stroke saver decode circuit 212;
6. stroke saver key status from the stroke saver decode circuit 212;
7. normal key status from the stroke saver decode circuit 212;
8. stop code from the stroke saver decode circuit 212;
9. equal status from the equal latch 211;
10. system timing from the system timing 201; and
11. display sequence from the display control 7.

Based upon the various inputs, the stroke saver sequencer logic 213 assumes a unique status and that status provides multiple output signals. For example, assuming the key was a stroke saver key, one output from stroke saver sequencer logic 213 is coupled to the display control 7 to inhibit normal display control processing.

In the event that the actuated key was not only a stroke saver key but a dual stroke key, then the stroke saver sequencer logic 213, based on the status of the equal latch 211 appropriately controls the address modifier 13. That is, if the equal latch 211 had been set, the address modifer 13 is controlled to modify its input, and if the equal latch 211 is not set, then no such control is effected. Likewise, for any stroke saver key, the character sequence counter 9 is controlled to load the contents of the start address storage 8, and based on subsequent decoding of each character sequence storage in the stroke saver decode circuit 212, the character sequence counter 9 is incremented. In the event of a stroke saver key actuation, the stroke saver control 4 enables the storage select 5 to respond appropriately to its input.

The next several steps in the processing have been described in connection with FIGS. 3 and 5, i.e., the contents of the start address storage 8 are loaded in the character sequence counter 9, and that is used to address the character sequence storage 10, whose output is coupled to the storage select 5 to address a unique location in the function control storage 6. Similarly, the contents of the character sequence storage 10 are coupled to the stroke saver decode circuit 212 where a capitalization information is provided to the stroke saver sequencer logic 213. That information, coupled with the status of the shift and shift lock latches 210a, 210b, determines capital control output of the stroke saver sequencer logic 213. More particularly, if the contents of the character sequence storage 10 indicate that a character should be capitalized, the capital control will result in capitalization of the character if the shift status is in the set state. On the other hand, if the shift status is not set, then the character will not be capitalized, regardless of the contents of the character sequence storage 10. Finally, if the shift lock status is set, the character will be capitalized regardless of the contents of the character sequence storage 10. At this time, the stroke saver sequencer logic 213 also enables the storage select 5 so that the output of the character sequence storage 10 can address a unique location in the function control storage 6. Of course, the function control storage 6, at the addressed location, stores the necessary drive signals, and the stroke saver sequencer logic 213 enables the display control 7 to, in turn, enable the I/O drivers 11 to allow the output of function control storage 6 to pass therethrough and result in a corresponding display. Before the end of the machine cycle in which that character is displayed, the status of the display sequence coupled to the stroke saver sequencer logic 213 through the status of the display sequence signal, results in incrementing the character sequence counter 9. Accordingly, a new location in the character sequence storage 10 is addressed and decoded in the stroke saver decode circuit 212. Similar operations result until a stop code is decoded. When the stop code is decoded, the stroke saver sequencer logic 213 responds, disabling the storage select 5 and terminates the inhibition to the display control 7.

This returns the text recorder to its normal operating function and if any display requests are pending, for example, because of buffered keystroke entries in the keystroke storage 3, processing of those entries can pick up at this point.

The foregoing description, while generally related to FIG. 3, is also pertinent to FIG. 5. In the event that a stroke saver key was depressed which was not a dual stroke key, then the stroke saver sequencer logic 213 never interrogates or determine the status of the equal latch 211 and thus, never enables the address modifier 13. However, if the stroke saver key depressed was also a dual stroke key, then prior to enabling the loading of the character sequence counter 9, the status of the equal latch 211 would be determined. If the equal latch 211 is set, the address modifier 13 is enabled. The remaining operation of FIG. 11 has already been explained in the case of the second actuation of a dual stroke key, and no further discussion appears necessary.

As was mentioned, it may be desirable to automatically add a space after a punctuation graphic, for example, those corresponding to keys 42 or 43. This is effected with the apparatus of FIG. 3 or 5 by simply designating keys 42 or 43 as stroke saver (or multi-character) keys and providing the sequence "," space or "." space in the associated character sequence storage 10.

Figure 8:
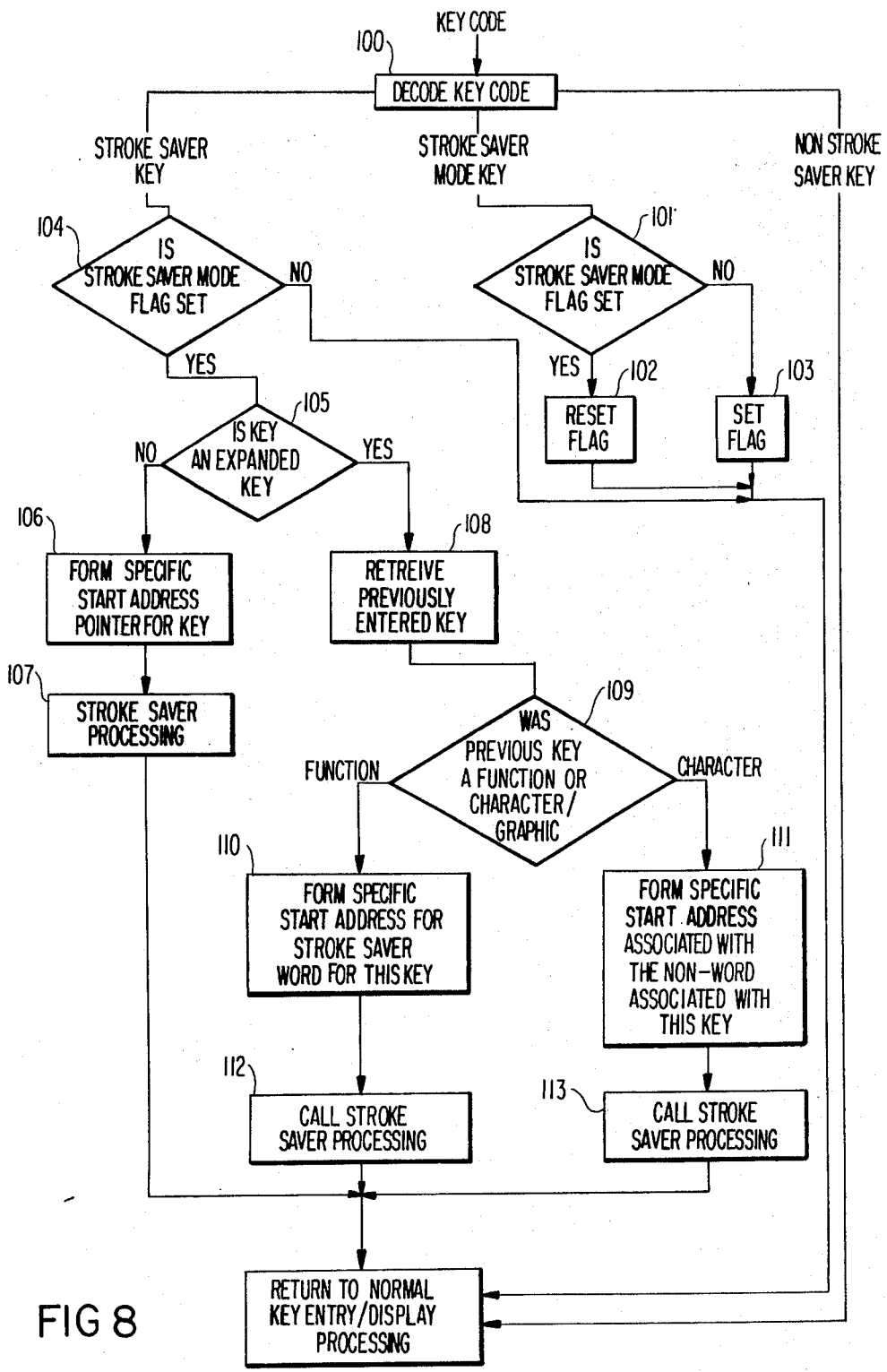
FIGS. 8 and 9 are flow diagrams illustrating the processing routines carried out by the microprocessor of FIG. 7; and, FIGS. 10 and 11 are detailed block diagrams of components of FIGS. 3 and 5.
Figure 9:
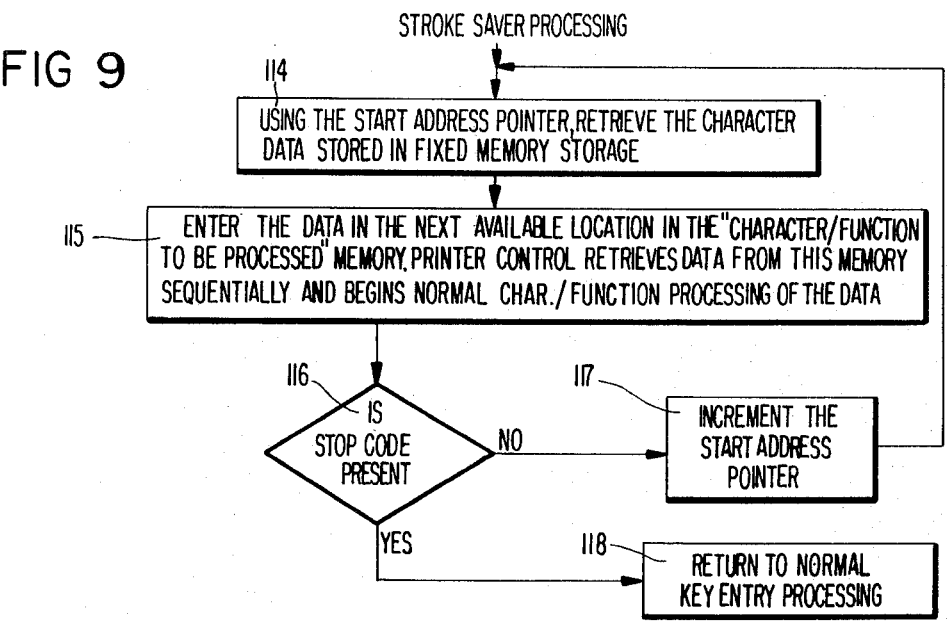

A further preferred embodiment of the invention is now disclosed in relation to FIGS. 7, 8 and 9. In this embodiment of the invention, the functions of the embodiment of FIGS. 3, 4A, and 4B are implemented with the further capability of implementing the functions implied by keys 35 and 36 (FIG. 2). Actuation of these keys (35, 36) in multi-character display mode results in displaying one of two multi-character sequences, the particular selected character sequence depending on the preceding keystroke, i.e., the keystroke before stroking key 35 or 36, for example. Similarly, actuation of key 37, when in the multi-character display mode, will result in the output of the multi-character (word) sequence associated with key 37 or the punctuation graphic depending on the previously stroked key. This embodiment of the invention is disclosed in connection with a software implementing logic device, and thus, as shown in FIG. 7, the apparatus includes a keyboard 20 and a keyboard interface 1 which may be identical to the apparatus disclosed in connection with FIGS. 3 and 5, as well as a display 21 which likewise is similar to the displays previously disclosed in that it may comprise a hardcopy printer or a display such as a CRT. A microprocessor 50 is employed to respond to each of the different key codes provided by the interface 1 and to output the necessary coded signals to output driver or interface 54 to appropriately drive display 21.

As shown in FIG. 7, the microprocessor 50 is coupled to the keyboard interface 1 and the interface 54 via data, address and control lines. The microprocessor 50 includes a sequential logic processor 52 and a read only storage (ROS) 53. Also coupled to the data, address and control lines of the microprocessor 50 are a read/write storage (R/W) device 51. Preferably, the read only storage 53 embodies in coded form a set of predetermined responses for the processor 52 as well as fixed data as will be defined hereinafter. For example, this fixed data may include a reserved area corresponding to the function control storage 6, files containing pointer information for pointing to specific locations in the function control storage (corresponding to the character sequence storge 10) as well as information used to develop an address to the pointer (corresponding to the start address storage 8). The read/write storage device 51, on the other hand, may include reserved areas for the present keystroke being processed, as well as keystrokes awaiting processing (all corresponding to the keystroke storage 3) and in addition, an area reserved for a previous key entry, corresponding to the previous key entry register 14.

In this embodiment of the invention, the microprocessor 50 recognizes three different classes of keys, i.e., a non-stroke saver key, the display processing for which is unchanged regardless of whether or not the apparatus is in a multi-character mode or not (for example, any one of the alphabetic character keys fall in this category); the stroke saver mode key 38 (which is processed to alter the mode in which the apparatus is operating) and a stroke saver key, i.e., for example, keys 23-37.

As has been disclosed, each actuation of a key causes the interface 1 to generate a key code, unique to that key, and the first step in the processing for display cpmprises step 100 (see FIG. 8) wherein the particular key code produced is decoded to determine whether or not it is a stroke saver key, a stroke saver mode key or a non-stroke saver key. Those skilled in the art will understand how the decoding function can be accomplished. One suitable technique is the use of a look-up table; another technique is to insure that the unique codes for the different categories of key actuation can be decoded by examination of one or two bit positions.

Assuming that the decode key code function 100 decodes a non-stroke saver key, the processor 50 executes the normal key entry/display processing. Such processing is similar to that shown in FIG. 1 of the present application and since it forms prior art to the application, no further discussion is believed necessary.

In the event that the decode key code function 100 results in the identification of stroke saver mode key 38, function 101 is performed to determine whether or not the stroke saver mode flag is set. The flag corresponds to the function performed by the stroke saver latch 210c of the function register 210 in stroke saver control 4. If it is set, then function 102 is performed to reset the flag. If the flag is not set, then function 103 is performed to set the flag. Either functions 102 or 103 terminates the processing for this key actuation.

In the event that decode key code function 100 detects actuation of a stroke saver key (i.e. keys 27–37), function 104 determines if the stroke saver mode flag is set, i.e., the mode flag that may be set at function 103. Assuming that the flag is set, function 105 determines if the actuated key is an expanded stroke saver key. An expanded stroke saver key is any key which can result in one of different possible displays depending on a prior keystroke or strokes. Such keys, for example, corresponding to keys 35–37 (FIG. 2) are the keys for which a determination must be made of previous key entries for processing. Assuming it is not an expanded stroke saver key, the function 106 forms the specific start address pointer for the multi-character sequence associated with the key. This entails a simple table look-up for non-expanded stroke saver keys which have a fixed response. With this specific start address pointer, function 107 calls the stroke saver processing, which will be discussed in connection with FIG. 9. The pointer formed by function 106 is similar to the function carried out by the start address storage 8 which is accessed by the key code itself, which access results in address to a character sequence storage 10 which itself is a pointer to the function control storage 6.

On the other hand, if at function 105, an expanded key stroke actuation was detected, then function 108 retrieves from memory the previously entered key, as in FIG. 5, for example, the previous key entry register 14 would contain this information, and the microprocessor 50 performs a similar function.

For the particular expanded keys 35 and 36, which of the two multi-character sequences are to be output depends upon the previous key actuation, i.e., for example, a prior space or carriage return function results in display of the word, whereas a prior hyphen or alphabetic character results in display of the suffix. Thus, function 109 determines whether the previous key entry was a function or a character/graphic, i.e., hyphen key. If a previous key entry was a function (such as a space bar or carriage return), then function 110 is performed to form a specific start address pointer associated with the stroke saver word. On the other hand, if the previous key entry function was a character or graphic, then function 111 forms the specific start address pointer associated with the stroke saver suffix (i.e., the non-word display). Functions 110 and 111 perform essentially similar functions to the address modifier 13, i.e., for one function, no address modification is effected, and for the other, the appropriate address modification produces the specific start address pointer. In either case, function 112 or 113 then calls stroke saver processing with the specific start address pointer. For key 37, the stroke saver word is displayed only if the prior keystroke was a function. In case the prior keystroke was a character or graphic, then the non-word, the punctuation mark is displayed. Accordingly, depending on the prior keystroke, either function 110 or 111 forms the appropriate start address.

As in the embodiment of FIG. 3 or 5, this embodiment can be arranged to automatically add a space after a punctuation graphic such as that of keys 37, 42 or 43. This is effected by firstly designating the keys (37, 42 or 43) as stroke saver keys in the function control storage area of ROS 53, and including in the character sequence storage area of ROS 53, a space after the address of the punctuation graphic and before the stop code. Accordingly, when in the stoke saver or multi-character mode, a space will be automatically added after the symbol. To eliminate this function, the operator need only actuate the stroke saver mode key 38 before actuating the punctuation key (such as punctuation key 42). Actuation of key 38, if in the multi-character mode, will change the mode to normal. In normal mode, of course, the graphic only is displayed in response to actuation of the punctuation key (such as punctuation key 42).

The stroke saver processing is illustrated in FIG. 9. The first function, function 114, employs the start address pointer passed with the call to the stroke saver processing (the start address pointer formed by functions 106, 110 or 111) to retrieve the character data stored in the fixed memory storage 53. Analogously, the apparatus of FIG. 5 uses the pointer to access the character sequence storage 10 which itself points to the desired character. Function 114 uses a similar fixed area of ROS memory 53 addressed by the pointer. With this character data, function 115 enters the data in the next available location in the character/function to be processed buffer in R/W storage 51 which is a buffer area which passes data to normal display processing. Function 116 determines if the stop code is present, and if it is not, the start address pointer is incremented and functions 114 and 115 are again performed. The loop of functions 114–117 are repeated until the stop code is detected. At this point, the microprocessor 50 has derived representations of each of the characters for the multi-character sequence which is desired to be displayed, and function 118 returns the microprocessor 50 to normal display processing.

From the foregoing, it should be apparent that the embodiment of FIGS. 7, 8 and 9 is capable of operating in a normal or multi-character mode, the response to actuating keys in the normal mode being that which is expected from the conventional typewriter. On the other hand, in the multi-character sequence mode (the stroke saver mode), the result of stroking a particular key depends on the key stroked. For a non-stroke saver key, the response is the same as it would have been in the normal mode. However, for a stroke saver, or multi-character sequence key, the response may be display of the associated multi-character sequence if, for example, the stroke saver key stroked was a non-expanded stroke saver key. On the other hand, if in the multi-character mode an expanded stroke saver key was stroked, the response may be one of two sequences, the sequence being determined by the previous key entry. The specific description of the embodiment of FIGS. 7–9 has not referred to the dual stroke keys discussed in connection with the first embodiment of the invention. However, it should be apparent to those skilled in the art that functions 109–111 are capable of performing a selection between different multi-character sequences which is necessary to operation of the dual stroke keys and accordingly, the embodiment of FIGS. 7–9 can indeed exhibit the response displayed by the first embodiment of the invention. More particularly, to implement the dual stroke key the test function 109 is altered to determine if the previously entered key equals the presently entered key (and if it is a dual stroke key). Depending on the result of the test one or another pointer is formed to point to the beginning of one or another multi-character sequence.

Signal processing using sequential logic processor 52 in typewriter-like devices is well within the skill of the art and is employed for example, in IBM electronic typewriters models 50, 60 and 75.

With this type of arrangement, the signal responses are, for the most part, defined by the structure of the read only storage 53, using the various basic operations of the processor 52 as building blocks. Part of the overall response characteristic is typically built into the interface 54 and the degree of pre- or post-processing of signals that occurs is typically selected in view of cost, performance and timing considerations. It should be appreciated, in addition, that similar response characteristics may be achieved using direct wired logic (for example, as shown in the first embodiment of the invention) using techniques well known to those skilled in the art, when taken in conjunction with the teachings of this application.

What is claimed is:

1. A multi-character display controller for use in a text recorder of the kind having:
   (1) a text display means for displaying character sequences;
   (2) keyboard means including a plurality of keys each producing a coded signal representing said key when actuated by an operator; and
   (3) decoder means for receiving coded signals from said keyboard means and for supplying corresponding drive signals for at least some of said keys to said text display means, wherein said multi-character display controller includes:
   mode means for producing a mode signal having normal and multi-character mode states to control an operating mode of said controller as either a normal or multi-character mode, said mode means responsive to operation action to alter said operating mode from a prior operating mode to a new operating mode and to maintain said new operating mode until further operator action,
   first means, responsive to said mode signal in a multi-character mode state for nullifying the normal response of said decoder means to at least a subset of said coded signals, and
   auxiliary means and storage means associated with said auxiliary means, said storage means retrievably storing signals representing preselected character sequences at locations corresponding to respective coded signals of said subset, said auxiliary means responsive to said mode signal in a multi-character mode state and to said storage means for supplying to said text display means drive signals representing a preselected character sequence corresponding to that defined by signals read from said storage means,
   in which said decoder means includes a function means for correlating at least some of said coded signals with associated drive signals and wherein said storage means includes:
   first memory means addressed by said coded signals including an entry for at least each of said coded signals in said subset,
   counter means responsive to said first memory means for storing signals representing said entry,
   second memory means addressed by said counter means including an entry for each of said coded signals in said subset, a first sub-entry located at a location designated by an entry from said first memory means, each said entry including a stop code as a final sub-entry,
   control means responsive to said second memory means for incrementing said counter means each time an output is produced by said second memory means, said control means responsive to a stop code read from said second memory means for inhibiting further incrementing of said counter means,
   and wherein said auxiliary means includes means for supplying outputs from said second memory means to address said function means.

2. The apparatus of claim 1 in which said keyboard means includes
   at least a shift key and a shift lock key and in which said auxiliary means includes a shift latch means and a shift lock latch means tracking actuation of said shift and shift lock keys respectively and in which
   said auxiliary means addresses said function means to supply said drive signals for each character in said preselected character sequence in an upper or lower case format in dependence on said shift and shift lock latch means.

3. The apparatus of claim 2 in which said auxiliary means supplies drive signals representing upper case characters for each character in said sequence if said shift lock latch means is in a predetermined condition and supplies drive signals for an upper case character for selected characters in said sequence if said shift latch means is in a predetermined condition and said shift lock latch means is not in a predetermined condition.

4. The apparatus of claim 3 wherein said selected characters are identified by contents of said storage means.

5. The apparatus of claim 1 in which said subset of coded signals includes at least one coded signal corresponding to a key associated with a punctuation mark and in which
   said second memory means includes three subentries for one said punctuation mark, a first subentry representing said punctuation mark,
   a second subentry representing a space function, and a third subentry representing said stop code.

6. For use in a text recorder of the kind having (1) text display means for displaying one or more characters in a sequence determined by an operator; (2) keyboard apparatus for operator actuation including a first set of keying devices for producing coded signals representing respective alphabetic characters in response to operator actuation and a second set of keying devices for producing coded signals representing respective numeric characters in response to operator actuation; and (3) decoder means for receiving coded signals from said keyboard apparatus and for supplying corresponding drive signals to said text display means, a multi-character display controller comprising:
   mode means for producing a mode signal having normal and multi-character mode states to control an operating mode of said controller as either a normal or multi-character mode, said mode means responsive to operator action to alter said operating mode from a prior operating mode to a new operating mode and to maintain said new operating mode until further operator action, first means, responsive to said mode signal in a multi-character state for nullifying the normal response of said decoder means to a subset of said coded signals corresponding to at least some of the keying devices from said second set of keying devices, auxiliary means responsive to said mode signal for responding to a coded signal in said subset of coded signals during operation in a multi-character mode to provide corresponding sequences of drive signals to said text display means in response to actuation of a single key producing a coded signal in said subset, said auxiliary means including storage means retrievably storing signals representing preselected character sequences at locations corresponding to respective coded signals from said subset of coded signals produced by actuation of at least some of said second set of keying devices in which said decoder means includes function means correlating at least some of said coded signals with corresponding drive signals and in which said storage mean includes first memory means addressed by said coded signals including an entry for at least each of said coded signals in said subset, counter means responsive to said first member means for storing signals representing said entry, second memory means addressed by said counter means including an entry for each of said coded signals in said subset, a first sub-entry located at a location designated by an entry in said first memory means, each said entry including a stop code as a final sub-entry, means for supplying outputs from said second memory means to address said function means, and an incrementing means responsive to said second memory mean, for incrementing said counter means each time an output is produced thereby, said incrementing means responsive to a stop code read from said second memory means for inhibiting further incrementing of said counter means.

7. The apparatus of claim 6 in which said storage means:

retrievably stores signals representing second preselected character sequences at locations corresponding to respective coded signals from at least some of said subset of coded signals, each of said second preselected character sequences including a space function preceding a first character, linkage means responsive to repeated actuation of an identical key producing a coded signal in said subset without intervening actuation of any other key, to alter the response of said auxiliary means in a second actuation to supply a second preselected character sequence from said second memory means.

8. The apparatus of claim 7 in which said linkage means includes a comparator for comparing a coded signal with an immediately preceding coded signal, a first latch set in response to a signal from said first memory means representing a coded signal from said subset of coded signals, a second latch set in response to an equality result from said comparator, and means for adjusting an input to said first memory means to access an entry representing said second preselected character sequence in response to a set condition of said first and second latches.

9. For use in a text recorder of the kind having (1) text display means for displaying one or more characters in a sequence determined by an operator; (2) keyboard apparatus for operator actuation including a first set of keying devices for producing coded signals representing respective alphabetic characters in response to operator actuation and a second set of keying devices for producing coded signals representing respective numeric characters in response to operator actuation; and (3) decoder means for receiving coded signals from said keyboard apparatus and for supplying corresponding drive signals to said text display means, a multi-character display controller comprising:

mode means for producing a mode signal having normal and multi-character mode states to control an operating mode of said controller as either a normal or multi-character mode, said mode means responsive to operator action to alter said operating mode from a prior operating mode to a new operating mode and to maintain said new operating mode until further operator action, first means, responsive to said mode signal in a multi-character state for nullifying the normal response of sid detector means to a subset of said coded signals corresponding to at least some of the keying devices from said second set of keying devices, auxiliary means responsive to said mode signal for responding to a coded signal in said subset of coded signals during operation in a multi-character mode to provide corresponding sequences of drive signals to said text display means in response to actuation of a single key producing a coded signal in said subset, said auxiliary means including storage means retrievably storing signals representingg preselected character sequences at locations corresponding to respective coded signals from said subset of coded signals produced by actuation of at least some of said second set of keying devices in which said keyboard apparatus includes a third set of keying devices for producing coded signals representing respective punctuation marks in response to operator actuation and a fourth set of keying devices for producing coded signals reresenting respective text recorder functions in response to operator actuation and in which said multi-character display controller further comprises:

buffer means for retaining a coded signal representing a prior operator key actuation until at least a subsequent operator key actuation, second means responsive to operator actuation of a keying device in said third set of keying devices, to said mode signal, and to said buffer means, for nullifying normal response to said decoder means to at least a second subset of coded signals representing actuation of a keying device of said third set of keying devices but only if a prior key stroke represented operator actuation of a key in said fourth set of keying devices and wherein, said auxiliary means includes means responsive to said mode signal, for responding to at least said second subset of coded signals during operation in said multi-character mode, to supply corresponding sequences of drive signals to said text display means, said storage means retrievably storing signals representing preselected character sequences at locations corresponding to respective coded signals from said second subset.

10. For use in a text recorder of the kind having (1) text display means; (2) a keyboard apparatus including a first set of keying devices for producing coded signals representing respective alphabetic characters in response to operator actuation and a second set of keying devices for producing coded signals representing respective non-alphabetic characters or functions in response to operator actuation; and (3) decoder means for receiving coded signals from the keyboard apparatus and for supplying corresponding drive signals to said text display means, a multi-character display controller comprising:

mode means for producing a mode signal and for changing said mode signal when actuated by the operator to command a change in operating mode of the text recorder from a normal mode of the text recorder to a multi-character mode or from a multi-character mode to a normal mode, first means, responsive to said mode signal, for nullifying the normal response of said decoder means to at least some coded signals produced by operator actuation of a key from said second set of keying devices; and storage means for retrievably storing signals representing a first group of preselected character sequences at locations corresponding to respective coded signals from at least a subset of said second set of keying devices, and for retrievably storing signals representing a second group of preselected character sequences at locations corresponding to identical respective coded signals from said subset of said second set of keying devices;

buffer means responsive to said keyboard apparatus for storing at least a coded signal representing prior operator key actuation;

and auxiliary means responsive to said mode signal and to said buffer means during operation in said multi-character mode to supply drive signals corresponding to a character sequence selected from said first or second group of preselected character sequences corresponding to a key actuation in dependence on the contents of said buffer means.

11. The apparatus of claim 10 in which
said decoder means includes a function means for correlating at least some of said coded signals and the corresponding drive signals and in which said storage means comprises
a first memory means including at least two entries for at least some of said coded signals corresponding to keying devices in said second set, a first of said entries corresponding to a particular coded signal, and a second entry corresponding to said particular coded signal modified,
counter means responsive to said first memory means for storing an output of said first memory means,
a second memory means addressed by said counter means with at least one entry for each entry in said first memory means including a first sub-entry and at least a last sub-entry representing a stop code,
address modifying means responsive to the contents of said buffer means and to a coded signal for controlling said first memory means to output said second entry,
and means responsive to said second memory means for incrementing said counter means until a stop code is read from said second memory means.

12. The apparatus of claim 11 wherein said address modifying means operates only when the contents of said buffer means and a coded signal are identical.

13. The apparatus of claim 12 wherein said address modifying means operates when the contents of said buffer means contains a coded signal corresponding to a text display function.

14. The apparatus of claim 12 wherein said first memory means includes said first entry and said second entry corresponding to a coded signal from a key in said second set of keying devices and said second memory means includes an entry corresponding to said second entry of said first memory means with an initial sub-entry corresponding to a space function.

15. The apparatus of claim 13 wherein said first memory means includes a first and second entry corresponding to said particular coded signal and to said particular coded signal modified, and wherein said second memory means has an entry for each entry in said first memory means, a first entry corresponding to a multi-character sequence.

16. The apparatus of claim 15 wherein said first entry of said memory means includes, after said multi-character sequence, entries representing a punctuation graphic, a space function and a stop code.

17. A method of operating a text recorder including a text display for displaying character sequences,
an operator actuated keyboard for producing coded signals corresponding to operator actuated keys and a decoder for responding to coded signals and producing drive signals to display corresponding characters,
to display multi-character sequences in response to operator actuation of a single key of a subset of keys of said keyboard but only when in a multi-character mode, and in which said subset of keys corresponds to non-alphabetic keys, comprising the steps of:
(a) providing a storage device correlating signals corresponding to specific key actuation with identification of the subset of keys arranged to produce said multi-character sequence,
(b) providing a mode means responsive to operator actuation to control an operating mode as either a normal or multi-character mode, said mode means responsive to operator action to alter an operating mode from a prior operating mode to a new operating mode and to maintain said new operating mode until further operator action,
(c) inhibiting normal operating of said decoder when in a multi-character mode and said storage device identifies a key actuation in said subset,
(d) producing, from a second storage device, a sequence of signals definitive of a multi-character sequence corresponding to said specific key actuation in response to said actuation of a key in said subset,
in which said step (d) includes
producing from said second storage device one or another sequence of signals definitive of one or another multi-character sequence corresponding to said specific key actuation in dependence on a specific prior key actuation,
whereby a multi-character sequence is produced each time any key in said subset is actuated in response solely to said actuation of said any key.

18. The method of claim 17 in which said one and another multi-character sequences are different words, with said another multi-character sequence beginning with a space function, and said another sequence is produced only if said prior key actuation was identical to said specific key actuation.

19. The method of claim 17 in which said one multi-character sequence is a punctuation graphic and said another multi-character sequence is a word and wherein said another sequence is produced only if said specific prior key actuation is a function and not a character or graphic.

* * * * *

UNITED STATES PATENT AND TRADEMARK OFFICE
CERTIFICATE OF CORRECTION

PATENT NO. : 4,464,070

DATED : August 7, 1984

INVENTOR(S) : Hanft et al

It is certified that error appears in the above-identified patent and that said Letters Patent is hereby corrected as shown below:

Col. 4, line 16, change "hereinaftr" to -hereinafter-.

Col. 9, line 16, change "reduce" to -produce-.

Col. 12, line 56, change "data" to -state-.

Col. 14, line 11, after "210a-210c" insert -provides-;

line 19, change "Yhe" to -The-;

line 24, change "stroke" to -strobe-;

line 25, change "210b 210c" to -210b, 210c-;

line 27, change "stroke" to -strobe-;

line 59, change "as" to -in-.

Col. 15, line 10, after "41" insert the word -a-.

Col. 16, line 6, change "out" to -our-.

Col. 18, line 5, change "implementing" to -implemented-;

line 52, change "cpmprises" to -comprises-.

Col. 23, line 27, change "member" to -memory-;

line 54, change "in" to -on-.

UNITED STATES PATENT AND TRADEMARK OFFICE
CERTIFICATE OF CORRECTION

PATENT NO. : 4,464,070

DATED : August 7, 1984

INVENTOR(S) : Hanft et al

It is certified that error appears in the above-identified patent and that said Letters Patent is hereby corrected as shown below:

Col. 24, line 27, change "sid" to -said-;

line 37, change "representingg" to -representing-;

line 56, change "to" to -of-.

Signed and Sealed this

Twenty-fifth Day of December 1984

[SEAL]

Attest:

*Attesting Officer*

GERALD J. MOSSINGHOFF

*Commissioner of Patents and Trademarks*